United States Patent
Zuchoski et al.

(10) Patent No.: US 10,005,507 B2
(45) Date of Patent: Jun. 26, 2018

(54) TRACK ASSEMBLY FOR AN ALL-TERRAIN VEHICLE

(71) Applicant: CAMSO INC., Magog (CA)

(72) Inventors: Jeremie Zuchoski, St-Leonard-d'Aston (CA); Denis Boisvert, St-Gerard-des-Laurentides (CA)

(73) Assignee: CAMSO INC., Quebec (CA)

( * ) Notice: Subject to any disclaimer, the term of this patent is extended or adjusted under 35 U.S.C. 154(b) by 0 days. days.

(21) Appl. No.: 13/928,759

(22) Filed: Jun. 27, 2013

(65) Prior Publication Data
US 2014/0008134 A1      Jan. 9, 2014

Related U.S. Application Data

(63) Continuation of application No. 13/711,663, filed on Dec. 12, 2012, which is a continuation of application
(Continued)

(30) Foreign Application Priority Data

Oct. 3, 2007   (CA) ..................................... 2606039

(51) Int. Cl.
*B62D 49/06* (2006.01)
*B62D 55/084* (2006.01)
(Continued)

(52) U.S. Cl.
CPC ............. *B62D 55/24* (2013.01); *B62D 49/06* (2013.01); *B62D 49/0635* (2013.01);
(Continued)

(58) Field of Classification Search
CPC ........ B62D 15/00; B62D 17/00; B62D 55/04; B62D 55/065; B62D 55/084; B62D 55/10;
(Continued)

(56) References Cited

U.S. PATENT DOCUMENTS

| 1,368,652 A | 2/1921 | Pennington et al. |
| 1,539,582 A | 5/1925 | Landry |

(Continued)

FOREIGN PATENT DOCUMENTS

| EP | 0395489 | 10/1990 |
| WO | WO 2006/066406 | 6/2006 |
| WO | WO 2006066406 A1 * | 6/2006 |

OTHER PUBLICATIONS

Camoplast, ATV/UTV Track Systems 2009-2010 Catalog, 8 pages.
(Continued)

*Primary Examiner* — Joseph M Rocca
*Assistant Examiner* — Daniel S Yeagley
(74) *Attorney, Agent, or Firm* — Finnegan, Henderson, Farabow, Garrett & Dunner, LLP (57) ABSTRACT

The present invention provides track assemblies and a method that allow bringing the contact patch towards the inside (the outside) of the suspension arm, by providing a asymmetric track assembly, either by lowering at least one inside (outside) support wheel relative to the remaining support wheels, or by using a belt that comprises, transversally, at least one first profile on the outer (inner) side thereof lower than a second profile on an inner side thereof.

64 Claims, 6 Drawing Sheets

Related U.S. Application Data

No. 12/684,698, filed on Jan. 8, 2010, now Pat. No. 8,347,991, which is a continuation of application No. 12/028,177, filed on Feb. 8, 2008, now abandoned.

(51) Int. Cl.

| | | |
|---|---|---|
| *B62D 55/24* | (2006.01) | |
| *B62D 55/10* | (2006.01) | |
| *B62D 55/14* | (2006.01) | |
| *B62D 55/065* | (2006.01) | |

(52) U.S. Cl.
CPC ......... *B62D 55/065* (2013.01); *B62D 55/084* (2013.01); *B62D 55/10* (2013.01); *B62D 55/14* (2013.01)

(58) Field of Classification Search
CPC .... B62D 55/108; B62D 55/112; B62D 55/12; B62D 55/14; B62D 55/24; B62D 55/244; B62D 55/26; B62D 21/14; B62D 49/0635
USPC ............. 180/9.25, 9.28, 9.3, 184, 190, 193; 305/168, 181, 185, 188, 127
See application file for complete search history.

(56) References Cited

U.S. PATENT DOCUMENTS

| | | | |
|---|---|---|---|
| 3,545,559 A | 12/1970 | Jones | |
| 3,598,454 A | 8/1971 | Richards | |
| 3,664,449 A | 5/1972 | Vardell | |
| 3,688,858 A | 9/1972 | Jespersen | |
| 3,771,616 A | 11/1973 | Parodi | |
| 3,774,708 A * | 11/1973 | Purcell et al. | 180/9.5 |
| 3,776,325 A | 12/1973 | Jespersen | |
| 3,841,424 A | 10/1974 | Purcell et al. | |
| 3,937,288 A | 2/1976 | Kehler | |
| 3,938,606 A | 2/1976 | Yancey | |
| 4,232,753 A | 11/1980 | Carlson | |
| RE32,442 E | 6/1987 | Satzler | |
| 4,681,177 A | 7/1987 | Zborowski | |
| 4,699,229 A | 10/1987 | Hirose et al. | |
| 4,714,125 A | 12/1987 | Stacy | |
| D298,018 S | 10/1988 | Cartwright | |
| 4,881,609 A | 11/1989 | Purcell et al. | |
| 4,953,919 A | 9/1990 | Langford | |
| 5,273,126 A | 12/1993 | Reed et al. | |
| 5,340,205 A | 8/1994 | Nagorcka | |
| 5,533,587 A | 7/1996 | Dow et al. | |
| 5,607,210 A * | 3/1997 | Brazier | B62D 55/04 305/131 |
| 5,842,757 A | 12/1998 | Kelderman | |
| D406,326 S | 4/1999 | Dandurand | |
| 5,899,543 A * | 5/1999 | Lykken et al. | 305/131 |
| RE36,284 E | 8/1999 | Kelderman | |
| 5,954,148 A | 9/1999 | Okumura et al. | |
| 6,006,847 A | 12/1999 | Knight | |
| 6,076,619 A | 6/2000 | Hammer | |
| 6,095,275 A | 8/2000 | Shaw | |
| 6,125,956 A | 10/2000 | Gignac | |
| 6,176,334 B1 | 1/2001 | Lorenzen | |
| 6,199,646 B1 | 3/2001 | Tani et al. | |
| RE37,174 E | 5/2001 | Grawey et al. | |
| 6,234,590 B1 | 5/2001 | Satzler | |
| 6,318,484 B2 * | 11/2001 | Lykken et al. | 180/9.48 |
| 6,401,847 B1 | 6/2002 | Lykken | |
| 6,505,896 B1 | 1/2003 | Boivin et al. | |
| 6,510,913 B1 | 1/2003 | Morin et al. | |
| D476,599 S | 7/2003 | Whittington | |
| 6,609,771 B2 | 8/2003 | Morin et al. | |
| 6,615,939 B1 | 9/2003 | Karales et al. | |
| D488,171 S | 4/2004 | Juncker et al. | |
| 6,810,975 B2 | 11/2004 | Nagorcka et al. | |
| 6,874,586 B2 | 4/2005 | Boivin et al. | |
| D505,136 S | 5/2005 | Brazier | |
| 6,904,986 B2 | 6/2005 | Brazier | |
| D528,133 S | 9/2006 | Brazier | |
| 7,131,503 B2 | 11/2006 | Brazier | |
| 7,131,507 B2 | 11/2006 | Wenger et al. | |
| 7,225,184 B2 | 5/2007 | Carrasco et al. | |
| 7,229,141 B2 | 6/2007 | Dandurand et al. | |
| D556,791 S | 12/2007 | Brazier | |
| 7,347,512 B2 | 3/2008 | Dandurand | |
| 7,497,530 B2 | 3/2009 | Bessette | |
| 7,533,945 B2 | 5/2009 | Jee et al. | |
| 7,597,161 B2 | 10/2009 | Brazier | |
| 7,708,092 B2 | 5/2010 | Despres | |
| 7,712,557 B2 * | 5/2010 | Duceppe | 180/9.21 |
| 7,866,767 B2 | 1/2011 | Lemaire et al. | |
| 8,056,655 B2 * | 11/2011 | Mallette et al. | 180/9.21 |
| 8,430,188 B2 * | 4/2013 | Hansen | 180/9.26 |
| 8,636,326 B2 * | 1/2014 | Inaoka | B62D 49/0635 305/125 |
| 2002/0017403 A1 | 2/2002 | Phely | |
| 2004/0017107 A1 | 1/2004 | Phely et al. | |
| 2004/0026995 A1 | 2/2004 | Lemieux | |
| 2004/0159475 A1 | 8/2004 | Moor, Jr. | |
| 2006/0113121 A1 * | 6/2006 | Radke et al. | 180/9.44 |
| 2006/0133121 A1 | 6/2006 | Radke et al. | |
| 2006/0181148 A1 | 8/2006 | Bessette | |
| 2007/0017714 A1 | 1/2007 | Brazier | |
| 2007/0029871 A1 | 2/2007 | Wake et al. | |
| 2007/0107950 A1 * | 5/2007 | Ki | 180/9.5 |
| 2007/0159004 A1 | 7/2007 | St. Amant | |
| 2007/0169968 A1 * | 7/2007 | Todd et al. | 180/9.1 |
| 2007/0181351 A1 * | 8/2007 | Brazier | B62D 55/04 180/9.54 |
| 2007/0240917 A1 | 10/2007 | Duceppe | |
| 2009/0194345 A1 | 8/2009 | Bessette | |
| 2009/0218882 A1 | 9/2009 | Rowbottom et al. | |
| 2012/0104840 A1 | 5/2012 | Zuchoski et al. | |

OTHER PUBLICATIONS

Office Action dated Feb. 12, 2013 issued in connection with U.S. Appl. No. 13/711,668, 7 pages.
Office Action dated Jan. 17, 2012 in connection with U.S. Appl. No. 12/684,698, 11 pages.
Office Action dated Nov. 9, 2012 in connection with Design U.S. Appl. No. 29/405,414, 7 pages.
Office Action dated Nov. 9, 2012 in connection with Design U.S. Appl. No. 29/405,416, 7 pages.
Office Action dated Nov. 9, 2012 in connection with Design U.S. Appl. No. 29/405,417, 8 pages.
Office Action from the Canadian Patent Office in counterpart Canadian Patent Application No. 2,881,212, dated Jan. 22, 2016, pp. 1-3.

* cited by examiner

TRACK ASSEMBLY FOR AN ALL-TERRAIN VEHICLE

CROSS REFERENCE TO RELATED APPLICATIONS

This application is a continuation, and claims benefit under 35 U.S.C. § 120, of U.S. patent application Ser. No. 13/711,663 filed on Dec. 12, 2012, which is a continuation, and claims benefit under 35 U.S.C. § 120, of U.S. patent application Ser. No. 12/684,698 filed on Jan. 8, 2010, now U.S. Pat. No. 8,347,991, which is a continuation, and claims benefit under 35 U.S.C. § 120, of U.S. patent application Ser. No. 12/028,177 filed on Feb. 8, 2008, now abandoned, which claims priority on Canadian application no. 2,606,039, filed on Oct. 3, 2007. All documents identified above are incorporated by reference herein.

FIELD OF THE INVENTION

The present invention relates to ATV. More specifically, the present invention is concerned with a track assembly for an all-terrain vehicle.

BACKGROUND OF THE INVENTION

As well known in the art, a track system may be installed on a wheeled ATV (or other wheeled recreational, industrial or agricultural vehicles), to provide an—at least partly—, temporarily, tracked ATV.

The resulting contact area between an endless belt of the tracked vehicle and the underlying ground surface, referred to as patch, is larger than the contact area, or patch, of a corresponding wheel of the vehicle when wheeled on the underlying ground surface, thereby increasing flotation of the vehicle, over smooth terrains such as snow for example.

A drawback is that, generally, this increased contact patch involves an increased area of friction, which needs to be opposed for steering. As a result, it is increasingly harder to rotate the patch around a pivot steering point and steering effort submitted to such a tracked vehicle is higher than to a corresponding wheeled vehicle, i.e. the ATV on its wheels for example.

Using endless belts having a curved transverse geometry allows reducing this problem by allowing an increased contact surface when needed, while maintaining a reduced contact surface on hard surfaces for example.

However, there is still a need in the art for a track assembly for an all-terrain vehicle.

SUMMARY OF THE INVENTION

More specifically, there is provided a vehicle having a main frame and supported on the ground by at least two track assemblies, each track assembly comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and iii) the belt laterally comprising regions of different profiles.

There is provided a drive system for a vehicle having a main frame supporting an engine and a body of the vehicle and steering device connected to the main frame, a longitudinal endless belt, disposed on the frame of the drive system and connected to the engine to propel the vehicle, being tensioned around corner wheels and a sprocket wheel, support wheels being provided on a lower run of the longitudinal endless belt, on each side of a suspension arm of the main frame, the drive system comprising a first lateral region and a second lateral region, the lateral regions being defined by at least one of: i) the endless belt laterally comprising regions of different profiles; and ii) at least one of the support wheels, on one of: i) an Inward side and ii) an outward side of the suspension arm, being located at a lower position in relation to remaining support wheels.

There is further provided a track assembly for a wheeled vehicle, comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and ii) the belt laterally comprising regions of different profiles.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 1:
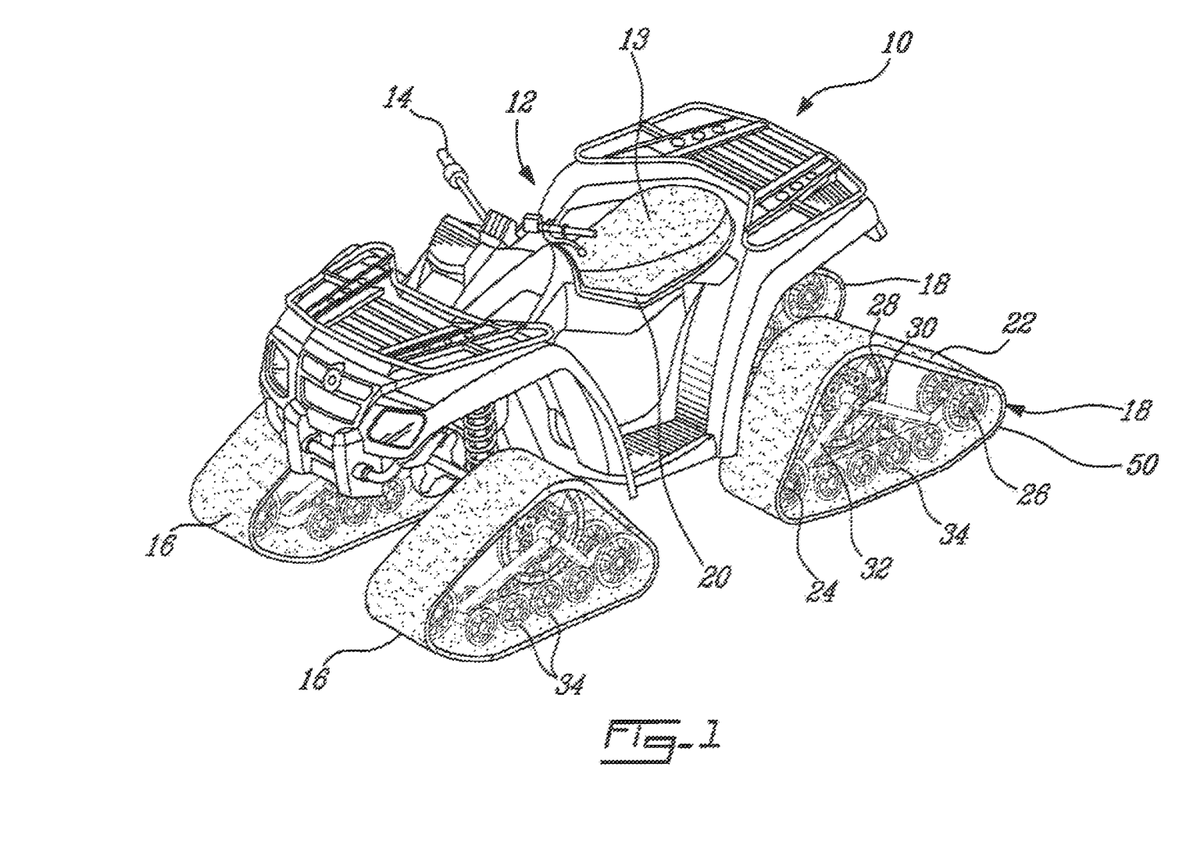
FIG. 1 is a front left-elevation view a vehicle according to an embodiment of an aspect of the present invention.

As illustrated in FIG. 1, a vehicle 10 according to an embodiment of an aspect of the present invention generally comprises a body 12 with a seat 13 for accommodating a rider (not shown) who uses handlebars 14, for example, to steer the vehicle. The body 12 is supported by track assemblies 16 in the front and track assemblies 18 in the back, in place of front and rear wheels respectively in the case of a wheeled vehicle, symmetrically about a vertical axis 20.

The track assemblies may be operatively connected to the engine (not shown) to propel the vehicle 10.

As best seen in FIG. 1, a track assembly typically comprises a longitudinal endless belt 22 tensioned around corner wheels 24, 26 and a sprocket wheel 28. The track assembly is removably connected to a hub 30 by a frame 32; the hub 30 corresponding to the one previously connecting a wheel of the wheeled vehicle and providing rotational motion to that wheel for example.

Figure 3:
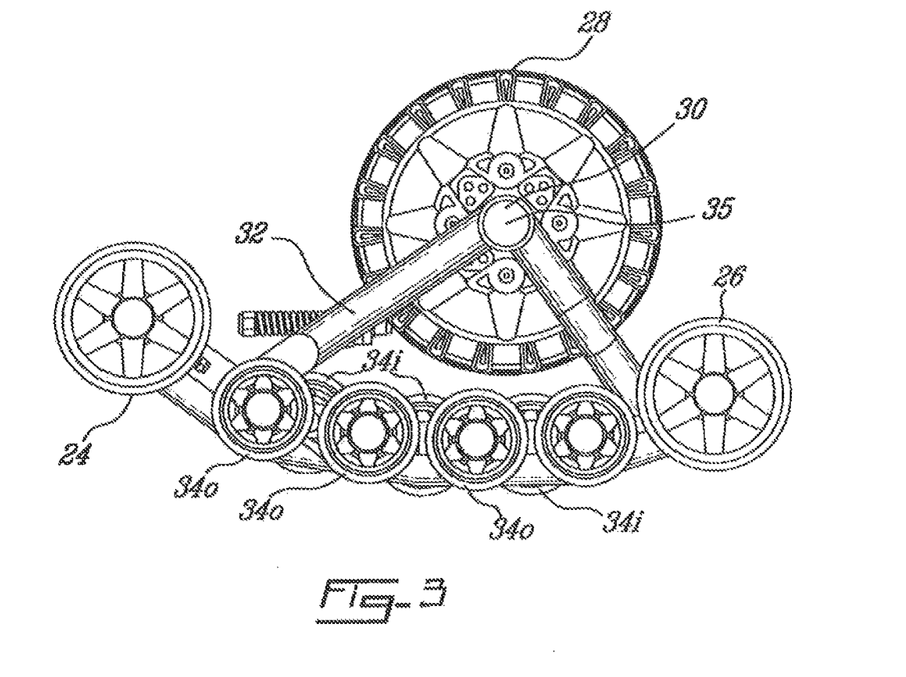
FIG. 3 is a side view of a track assembly according to an embodiment of an aspect of the present invention.

In FIG. 3, the hub 30 transfers its rotational motion to the sprocket wheel 28 that turns the track assembly around the same hub axis 30 and sprocket axis 35 by contact with the endless belt 22. The sprocket 28 and frame 32 are independently rotatable about hub 30.

Figure 2:
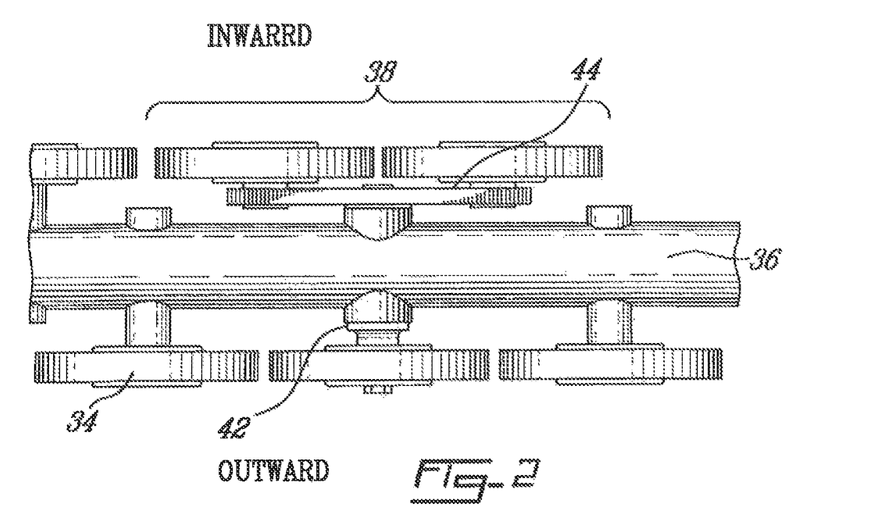
FIG. 2 is a partial top view of a track assembly according to an embodiment of an aspect of the present invention.
Figure 4:
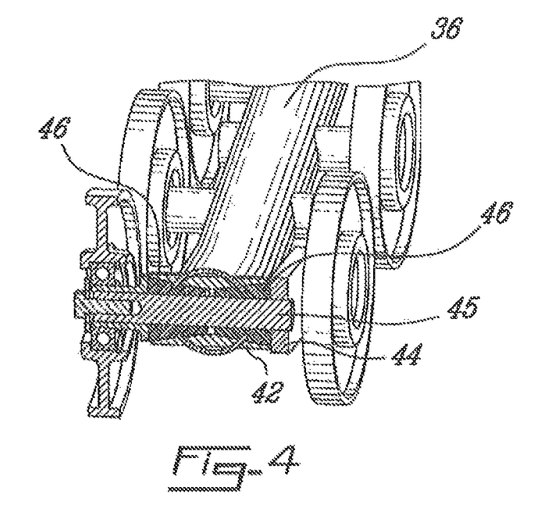
FIG. 4 is a cross section of the track assembly of FIG. 2.

Support wheels 34 are provided, on a lower run of the endless belt 22, on each side of a suspension arm 36 of the main frame 32 best seen in FIGS. 2 and 4 for example.

The endless belt 22 of each track assembly is typically an endless reinforced rubber belt, having a ground engaging surface and an inner surface. The ground-engaging surface may be provided with traction lugs that engage the underlying ground surface, whereas the inner surface is provided with driving lugs that engage the wheels.

Figure 7:
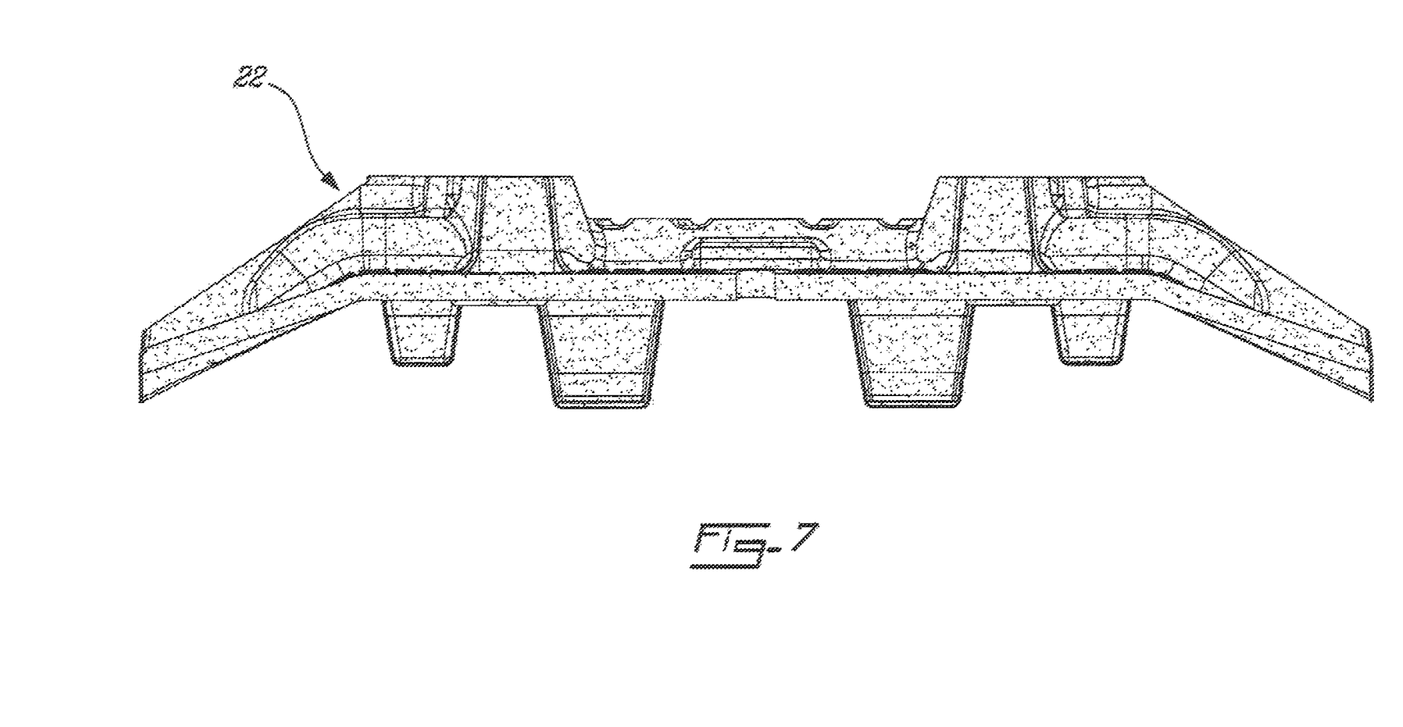
FIG. 7 is a cross section of a belt having a generally convex transverse profile.

The endless belt 22 may have a generally convex transverse profile, from the outward peripheral edge to the inner peripheral edge thereof, to provide a limited contact surface with the underground when the underground is hard, as known in the art (see FIG. 7).

When replacing a tire of a vehicle by a track assembly without modification of the geometry of the vehicle, the contact area, now between the endless belt and the underground surface, is generally shifted outward relative to the contact patch previously between the tire and the underground surface. It is found that by lowering an inner support wheel, the contact patch may be repositioned.

In a first embodiment of the present invention, as illustrated in FIGS. 2 to 4, the contact patch of the track system is shifted laterally in relation to the suspension arm 36, either inwards or outwards, by providing that at least one support wheel 34 be lower that the remaining ones, on the inward side or the outward side of the suspension arm 36 respectively.

Thus, as illustrated in FIG. 3, inside support wheels 34*i* may be lowered slightly relative to outside support wheels 34*o*, so as to shift the contact patch laterally inwards, i.e. away from the outward peripheral edge 50 of the width of the belt 22 (see FIG. 1).

Providing at least one support wheel lower than the remaining support wheels, on the inside of the main suspension arm, allows the contact patch provided by this at least one lower support wheel to be positioned at the location it used to be when the vehicle, conceived for tires, was on tires.

As known in the art, support wheels 34 may further be arranged in tandem in order to alleviate the load on the contacts points created, as tandem 38 shown in FIG. 2, which frame 44 is mounted by pivot 42 to the suspension arm 36 of the main frame 32.

The frame 44 of the tandem 38 of these inside support wheels 34*i*, which are thus in the contact patch, being mounted on the pivot 42 (FIG. 2), is able to adapt and conform to the underground terrain.

In such an arrangement, by providing that at least one lower support wheel is mounted on a secondary frame 44 pivotally connected to the main suspension arm so that the motion of the secondary frame is relatively independent from the rest of the track assembly, the generated contact patch moves as requested by the movement of the vehicle, for instance when the track pivots around a vertical axis for the vehicle being able to turn.

As shown in FIG. 4, the axle 45 of the tandem 38 with lowered support wheels may be provided with rubber bushings 46, for a soft suspension 44 independent from the main suspension 32, by providing a further cushioning versus shocks, and further improved adaptation to the underground terrain.

Figure 5:
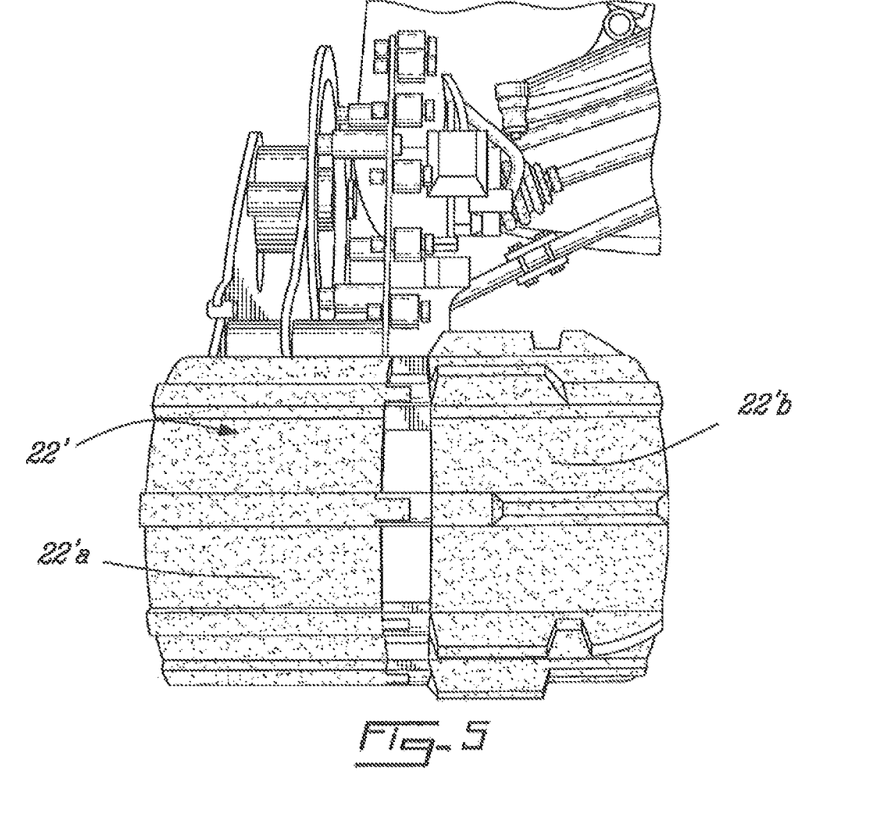
FIG. 5 illustrates a belt of a track assembly according to a further embodiment of the present invention.
Figure 6A:
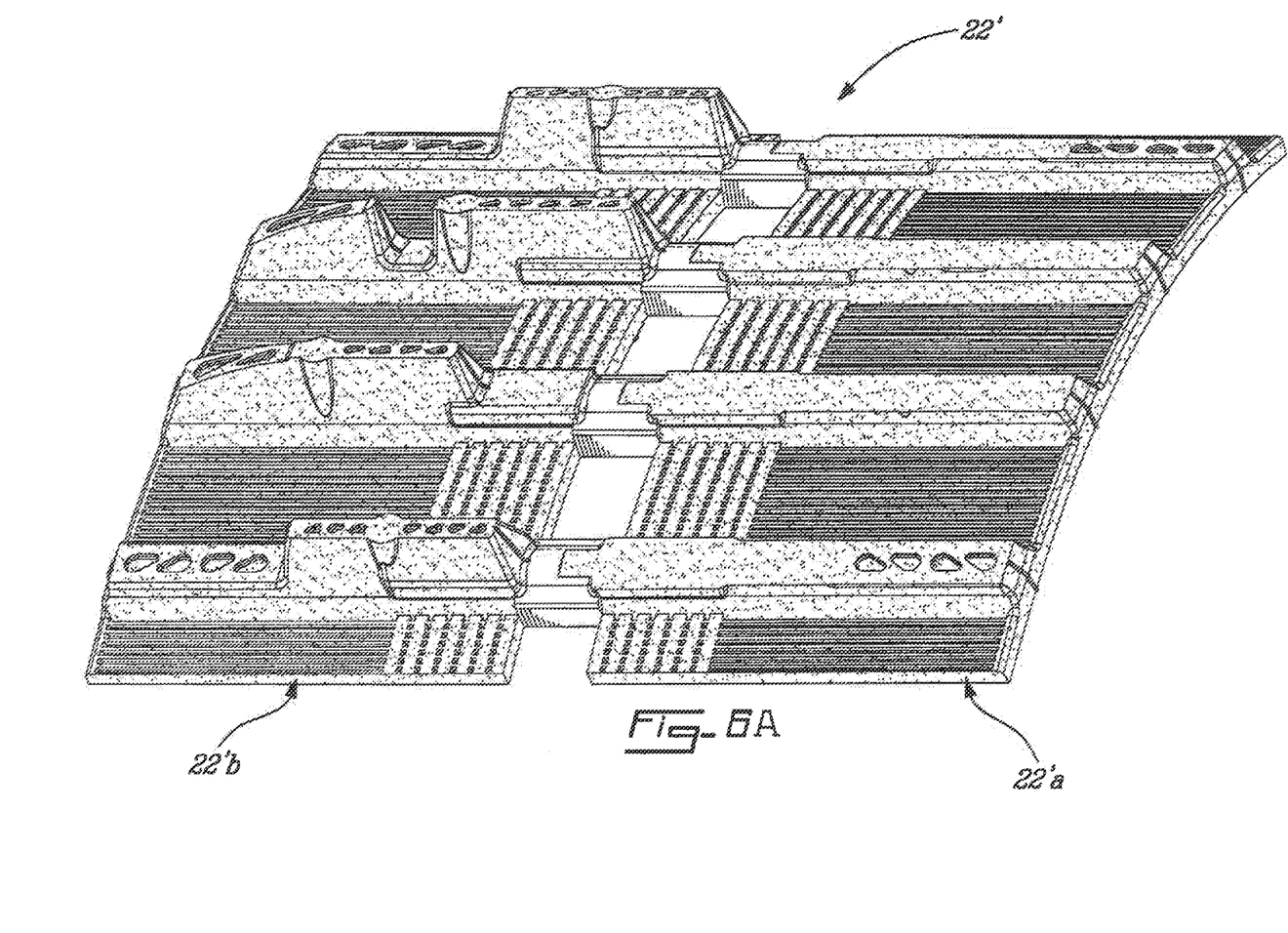
FIG. 6 are upper partial perspective views of: a) an asymmetric belt and b) an asymmetric belt having a generally convex transverse profile, for a track assembly according to a further embodiment of the present invention.
Figure 6B:
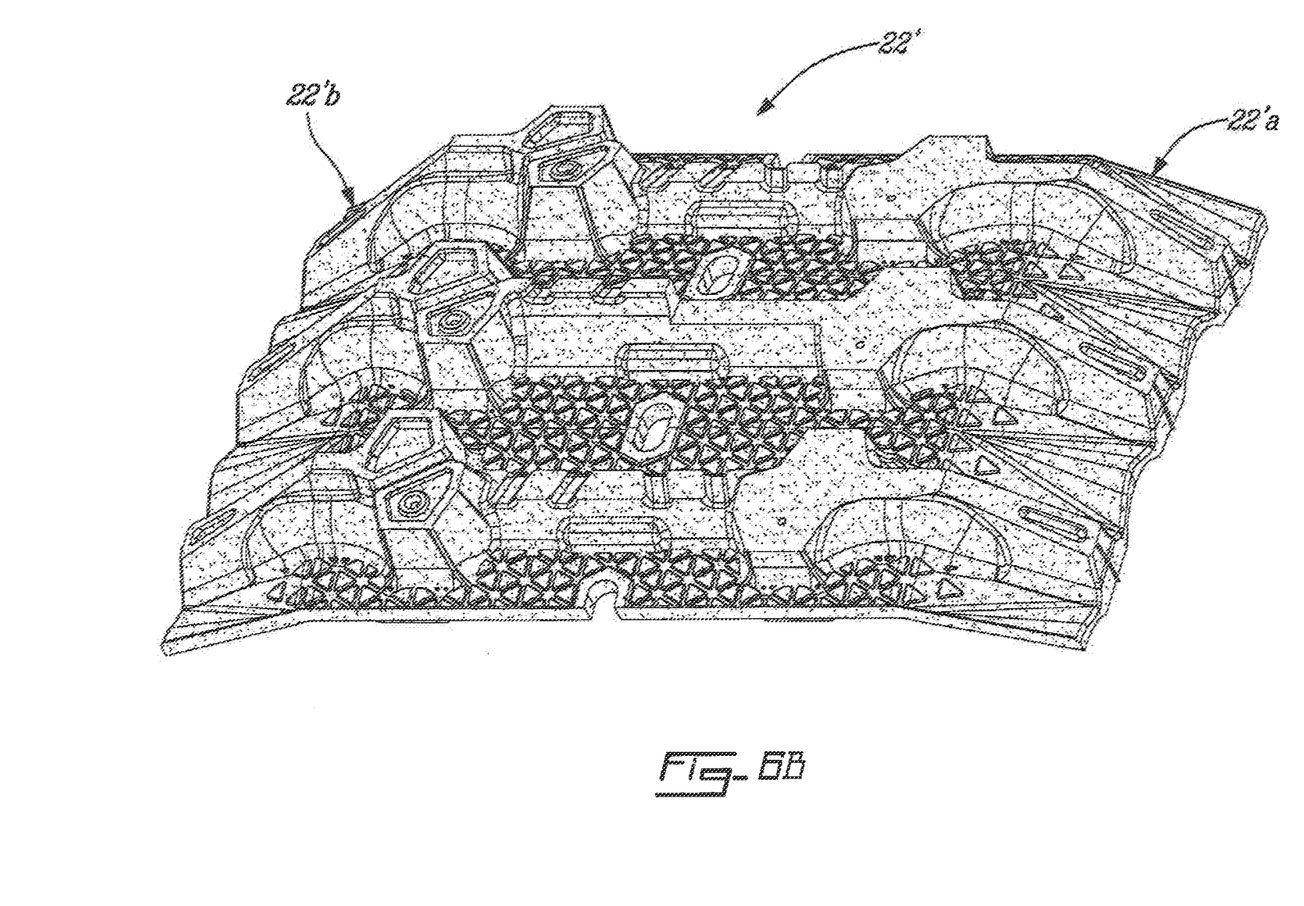

In a second embodiment illustrated for example in FIGS. 5 and 6, the contact patch of the track system is shifted laterally in relation to the suspension arm 36 by providing that the belt 22' comprises, transversally, at least one first profile 22'*a* on the outer side thereof, and a second profile 22'*b* on an inner side thereof. By providing that the second profile 22'*b* on an inner side is higher that the first profile 22'*a*, the contact patch is thus brought towards the inside of the suspension arm 36.

Therefore, the contact patch of a track system may be shifted laterally in relation to the suspension arm 36, inwards (or outwards), by providing a asymmetric track assembly, either by lowering at least one inside (outside) support wheel relative to the remaining support wheels, or by using a belt that comprises, transversally, at least one first profile on the outer side thereof lower (higher) than a second profile on an inner side thereof.

As people in the art will appreciate, an asymmetric track according to the present invention may combine at least one inside support wheel lowered relative to the remaining support wheels and a varying-profile belt, as described hereinabove.

Therefore, the present invention provides track assemblies and a method that allow bringing the contact patch towards the inside of the suspension arm 36, thereby repositioning the normal tire contact patch, i.e. the contact patch of the vehicle when on wheels. As a result, the steering effort of the track system is reduced to a minimum in a range of conditions, including snow, dirt, asphalt, rocks, etc, for example.

Therefore, according to an aspect of the present invention, there is provided a vehicle comprising at least two asymmetric track assemblies replacing wheels of a wheeled vehicle.

A suspension as described herein may be applied to a range of wheeled vehicles, such as for example recreational vehicles, ATV, light industrial vehicles, industrial vehicles, agricultural vehicles and military vehicles.

The present invention allows reducing the steering effort in such vehicles, which geometry of the suspension Is specifically designed for wheels, to a minimum in all conditions, snow, dirt, asphalt, rocks, etc.

Although the present invention has been described hereinabove by way of embodiments thereof, it may be modified, without departing from the nature and teachings of the subject invention as defined in the appended claims.

What is claimed is:

1. A track assembly for providing traction to a vehicle on a ground surface, the track assembly comprising:
   a) an endless track comprising:
      i. a ground-engaging outer surface for engaging the ground surface; and
      ii. an inner surface opposite to the ground-engaging outer surface; and
   b) a track-engaging system for driving and guiding the endless track, the track-engaging system comprising:
      i. a drive wheel for driving the endless track;
      ii. a front corner wheel and a rear corner wheel spaced apart in a longitudinal direction of the track assembly;
      iii. a plurality of support wheels disposed between the front corner wheel and the rear corner wheel in the longitudinal direction of the track assembly; and iv. a wheel-supporting arrangement supporting the front corner wheel, the rear corner wheel, and the support wheels, the wheel-supporting arrangement comprising:
a first wheel-supporting structure interconnecting the front corner wheel and the rear corner wheel; and
a second wheel-supporting structure carrying a first one of the support wheels and a second one of the support wheels and pivotable relative to the first wheel-supporting structure when the track assembly moves on the ground surface, an axis of rotation of the first one of the support wheels and an axis of rotation of the second one of the support wheels being spaced apart in the longitudinal direction of the track assembly;
a third one of the support wheels being mounted to the first wheel-supporting structure such that an axle of the third one of the support wheels intersects the first wheel-supporting structure;
the endless track being disposed around the track-engaging system, a lower run of the endless track extending under the front corner wheel, the rear corner wheel, and the support wheels to engage the ground surface, the track assembly being mountable to the vehicle such that the track assembly is steerable by a steering device of the vehicle to change an orientation of the track assembly relative to a body of the vehicle in order to turn the vehicle.

2. The track assembly claimed in claim 1, wherein the lower run of the endless track comprises a front segment under the front corner wheel, a rear segment under the rear corner wheel, and an intermediate segment under the support wheels and extending lower than a given one of the front segment and the rear segment of the lower run of the endless track when the ground surface is horizontal.

3. The track assembly claimed in claim 2, wherein the given one of the front segment and the rear segment of the lower run of the endless track is the front segment of the lower run of the endless track.

4. The track assembly claimed in claim 3, wherein the intermediate segment of the lower run of the endless track extends lower than the rear segment of the lower run of the endless track when the ground surface is horizontal.

5. The track assembly claimed in claim 1, wherein a bottom of the front corner wheel is higher than a bottom of a frontmost one of the support wheels when the ground surface is horizontal.

6. The track assembly claimed in claim 5, wherein a bottom of the rear corner wheel is higher than a bottom of a rearmost one of the support wheels when the ground surface is horizontal.

7. The track assembly claimed in claim 1, wherein a bottom of the front corner wheel is higher than a bottom of the rear corner wheel when the ground surface is horizontal.

8. The track assembly claimed in claim 1, wherein the first one of the support wheels and the second one of the support wheels extend lower than a given one of the front corner wheel and the rear corner wheel when the ground surface is horizontal.

9. The track assembly claimed in claim 8, wherein the given one of the front corner wheel and the rear corner wheel is the front corner wheel.

10. The track assembly claimed in claim 9, wherein the first one of the support wheels and the second one of the support wheels extend lower than the rear corner wheel when the ground surface is horizontal.

11. The track assembly claimed in claim 1, wherein the first one of the support wheels and the second one of the support wheels extend lower than the third one of the support wheels when the ground surface is horizontal.

12. The track assembly claimed in claim 1, wherein a span of the first one of the support wheels and the second one of the support wheels in the longitudinal direction of the track assembly intersects an axis about which the endless track is pivotable on the ground surface to change the orientation of the track assembly relative to the body of the vehicle in order to turn the vehicle.

13. The track assembly claimed in claim 1, wherein the second wheel-supporting structure is pivotable relative to the first wheel-supporting structure about a pivot located between the axis of rotation of the first one of the support wheels and the axis of rotation of the second one of the support wheels in the longitudinal direction of the track assembly.

14. The track assembly claimed in claim 1, wherein the second wheel-supporting structure is pivotable relative to the first wheel-supporting structure about a pivot located between extremities of the drive wheel in the longitudinal direction of the track assembly.

15. The track assembly claimed in claim 1, wherein: the endless track comprises a first lateral edge and a second lateral edge defining a width of the endless track; and the first one of the support wheels and the second one of the support wheels are located closer to the first lateral edge of the endless track than to the second lateral edge of the endless track in a widthwise direction of the endless track.

16. The track assembly claimed in claim 15, wherein the first lateral edge of the endless track is located closer to a center of the vehicle than the second lateral edge of the endless track when the track assembly is mounted to the vehicle.

17. The track assembly claimed in claim 1, wherein: the endless track comprises a first lateral edge and a second lateral edge defining a width of the endless track; the first wheel-supporting structure comprises a suspension member extending from the front corner wheel to the rear corner wheel; and the first one of the support wheels and the second one of the support wheels are disposed between the suspension member and the first lateral edge of the endless track.

18. The track assembly claimed in claim 17, wherein the first lateral edge of the endless track is located closer to a center of the vehicle than the second lateral edge of the endless track when the track assembly is mounted to the vehicle.

19. The track assembly claimed in claim 17, wherein the third one of the support wheels is disposed between the suspension member and the second lateral edge of the endless track.

20. The track assembly claimed in claim 19, wherein the first one of the support wheels and the second one of the support wheels extend lower than the third one of the support wheels when the ground surface is horizontal.

21. The track assembly claimed in claim 1, wherein an axis of rotation of the third one of the support wheels is spaced apart from the axis of rotation of the first one of the support wheels and the axis of rotation of the second one of the support wheels in the longitudinal direction of the track assembly.

22. The track assembly claimed in claim 21, wherein the first one of the support wheels and the second one of the support wheels extend lower than the third one of the support wheels when the ground surface is horizontal.

23. The track assembly claimed in claim 1, wherein the wheel-supporting arrangement comprises a resilient bushing disposed between the first wheel-supporting structure and the second wheel-supporting structure to cushion against shocks.

24. The track assembly claimed in claim 1, wherein a distance between an axis of rotation of the drive wheel and an axis of rotation of the front corner wheel in the longitudinal direction of the track assembly is different from a distance between the axis of rotation of the drive wheel and an axis of rotation of the rear corner wheel in the longitudinal direction of the track assembly.

25. The track assembly claimed in claim 1, wherein the track assembly is pivotable relative to the body of the vehicle about an axis of rotation of the drive wheel.

26. The track assembly claimed in claim 1, wherein the track assembly is mountable to the vehicle in place of a ground-engaging wheel comprising a tire.

27. The track assembly claimed in claim 1, wherein the vehicle is an ATV.

28. The track assembly claimed in claim 27, wherein the ATV comprises handlebars for steering the ATV.

29. The track assembly claimed in claim 1, wherein the first one of the support wheels, the second one of the support wheels, and the third one of the support wheels are disposed on a lateral side of the first wheel-supporting structure.

30. The track assembly claimed in claim 1, wherein: the first one of the support wheels and the second one of the support wheels are disposed on a first lateral side of the first wheel-supporting structure; and the third one of the support wheels is disposed on a second lateral side of the first wheel-supporting structure opposite to the first lateral side of the first wheel-supporting structure.

31. The track assembly claimed in claim 30, wherein the third one of the support wheels overlaps with at least one of the first one of the support wheels and the second one of the support wheels in the longitudinal direction of the track assembly.

32. A set of four track assemblies for providing traction to a vehicle on a ground surface, each track assembly of the set of four track assemblies comprising:
  a) an endless track comprising:
    i. a ground-engaging outer surface for engaging the ground surface; and
    ii. an inner surface opposite to the ground-engaging outer surface; and
  b) a track-engaging system for driving and guiding the endless track, the track-engaging system comprising:
    i. a drive wheel for driving the endless track;
    ii. a front corner wheel and a rear corner wheel spaced apart in a longitudinal direction of the track assembly;
    iii. a plurality of support wheels disposed between the front corner wheel and the rear corner wheel in the longitudinal direction of the track assembly; and
    iv. a wheel-supporting arrangement supporting the front corner wheel, the rear corner wheel, and the support wheels,
    the endless track being disposed around the track-engaging system, a lower run of the endless track extending under the front corner wheel, the rear corner wheel, and the support wheels to engage the ground surface;
  wherein the wheel-supporting arrangement of a given track assembly of the set of four track assemblies comprises:
    a first wheel-supporting structure interconnecting the front corner wheel and the rear corner wheel of the given track assembly; and
    a second wheel-supporting structure carrying a first one of the support wheels of the given track assembly and a second one of the support wheels of the given track assembly and pivotable relative to the first wheel-supporting structure when the given track assembly moves on the ground surface, an axis of rotation of the first one of the support wheels and an axis of rotation of the second one of the support wheels being spaced apart in the longitudinal direction of the given track assembly;
  wherein a third one of the support wheels of the given track assembly is mounted to the first wheel-supporting structure of the given track assembly such that an axle of the third one of the support wheels of the given track assembly intersects the first wheel-supporting structure of the given track assembly; and
  wherein each of at least two track assemblies of the set of four track assemblies is mountable to the vehicle such that each of the at least two track assemblies is steerable by a steering device of the vehicle to change an orientation of each of the at least two track assemblies relative to a body of the vehicle in order to turn the vehicle.

33. A track assembly for providing traction to a vehicle on a ground surface, the track assembly comprising:
  a) an endless track comprising:
    i. a ground-engaging outer surface for engaging the ground surface; and
    ii. an inner surface opposite to the ground-engaging outer surface; and
  b) a track-engaging system for driving and guiding the endless track, the track-engaging system comprising:
    i. a drive wheel for driving the endless track;
    ii. a front corner wheel and a rear corner wheel spaced apart in a longitudinal direction of the track assembly;
    iii. a plurality of support wheels disposed between the front corner wheel and the rear corner wheel in the longitudinal direction of the track assembly; and
    iv. a wheel-supporting arrangement supporting the front corner wheel, the rear corner wheel, and the support wheels, the wheel-supporting arrangement being configured such that, when the track assembly moves on the ground surface;
      an axis of rotation of a movable one of the support wheels is movable relative to an axis of rotation of the front corner wheel and an axis of rotation of the rear corner wheel to vary a distance between the axis of rotation of the movable one of the support wheels and the axis of rotation of the front corner wheel and vary a distance between the axis of rotation of the movable one of the support wheels and the axis of rotation of the rear corner wheel; and
      an axis of rotation of a fixed one of the support wheels is substantially fixed relative to the axis of rotation of the front corner wheel and the axis of rotation of the rear corner wheel to substantially maintain a distance between the axis of rotation of the fixed one of the support wheels and the axis of rotation of the front corner wheel and substantially maintain a distance between the axis of rotation of the fixed one of the support wheels and the axis of rotation of the rear corner wheel;

the endless track being disposed around the track-engaging system, a lower run of the endless track extending under the front corner wheel, the rear corner wheel, and the support wheels to engage the ground surface, the track assembly being mountable to the vehicle such that the track assembly is steerable by a steering device of the vehicle to change an orientation of the track assembly relative to a body of the vehicle in order to turn the vehicle.

34. The track assembly claimed in claim 33, wherein the lower run of the endless track comprises a front segment under the front corner wheel, a rear segment under the rear corner wheel, and an intermediate segment under the support wheels and extending lower than a given one of the front segment and the rear segment of the lower run of the endless track when the ground surface is horizontal.

35. The track assembly claimed in claim 34, wherein the given one of the front segment and the rear segment of the lower run of the endless track is the front segment of the lower run of the endless track.

36. The track assembly claimed in claim 35, wherein the intermediate segment of the lower run of the endless track extends lower than the rear segment of the lower run of the endless track when the ground surface is horizontal.

37. The track assembly claimed in claim 33, wherein a bottom of the front corner wheel is higher than a bottom of a frontmost one of the support wheels when the ground surface is horizontal.

38. The track assembly claimed in claim 37, wherein a bottom of the rear corner wheel is higher than a bottom of a rearmost one of the support wheels when the ground surface is horizontal.

39. The track assembly claimed in claim 33, wherein a bottom of the front corner wheel is higher than a bottom of the rear corner wheel when the ground surface is horizontal.

40. The track assembly claimed in claim 33, wherein the movable one of the support wheels extends lower than a given one of the front corner wheel and the rear corner wheel when the ground surface is horizontal.

41. The track assembly claimed in claim 40, wherein the given one of the front corner wheel and the rear corner wheel is the front corner wheel.

42. The track assembly claimed in claim 41, wherein the movable one of the support wheels extends lower than the rear corner wheel when the ground surface is horizontal.

43. The track assembly claimed in claim 33, wherein the movable one of the support wheels extends lower than the fixed one of the support wheels when the ground surface is horizontal.

44. The track assembly claimed in claim 33, wherein: the movable one of the support wheels is a first one of the support wheels; the wheel-supporting arrangement is configured such that, when the track assembly moves on the ground surface, an axis of rotation of a second one of the support wheels is movable relative to the axis of rotation of the front corner wheel and the axis of rotation of the rear corner wheel to vary a distance between the axis of rotation of the second one of the support wheels and the axis of rotation of the second one of the support wheels and the axis of rotation of the rear corner wheel; and the axis of rotation of the first one of the support wheels and the axis of rotation of the second one of the support wheels are spaced apart in the longitudinal direction of the track assembly.

45. The track assembly claimed in claim 44, wherein a span of the first one of the support wheels and the second one of the support wheels in the longitudinal direction of the track assembly intersects an axis about which the endless track is pivotable on the ground surface to change the orientation of the track assembly relative to the body of the vehicle in order to turn the vehicle.

46. The track assembly claimed in claim 44, wherein the wheel-supporting arrangement comprises: a first wheel-supporting structure interconnecting the front corner wheel and the rear corner wheel; and a second wheel-supporting structure carrying the first one of the support wheels and the second one of the support wheels and pivotable relative to the first wheel-supporting structure.

47. The track assembly claimed in claim 46, wherein the second wheel-supporting structure is pivotable relative to the first wheel-supporting structure about a pivot located between the axis of rotation of the first one of the support wheels and the axis of rotation of the second one of the support wheels in the longitudinal direction of the track assembly.

48. The track assembly claimed in claim 46, wherein the second wheel-supporting structure is pivotable relative to the first wheel-supporting structure about a pivot located between extremities of the drive wheel in the longitudinal direction of the track assembly.

49. The track assembly claimed in claim 44, wherein an axle of the fixed one of the support wheels intersects the first wheel-supporting structure.

50. The track assembly claimed in claim 44, wherein the first one of the support wheels, the second one of the support wheels, and the fixed one of the support wheels are disposed on a lateral side of the first wheel-supporting structure.

51. The track assembly claimed in claim 44, wherein: the first one of the support wheels and the second one of the support wheels are disposed on a first lateral side of the first wheel-supporting structure; and the fixed one of the support wheels is disposed on a second lateral side of the first wheel-supporting structure opposite to the first lateral side of the first wheel-supporting structure.

52. The track assembly claimed in claim 51, wherein the fixed one of the support wheels overlaps with at least one of the first one of the support wheels and the second one of the support wheels in the longitudinal direction of the track assembly.

53. The track assembly claimed in claim 33, wherein: the endless track comprises a first lateral edge and a second lateral edge defining a width of the endless track; and the movable one of the support wheels is located closer to the first lateral edge of the endless track than to the second lateral edge of the endless track in a widthwise direction of the endless track.

54. The track assembly claimed in claim 53, wherein the first lateral edge of the endless track is located closer to a center of the vehicle than the second lateral edge of the endless track when the track assembly is mounted to the vehicle.

55. The track assembly claimed in claim 33, wherein: the endless track comprises a first lateral edge and a second lateral edge defining a width of the endless track; the wheel-supporting arrangement comprises a suspension member extending from the front corner wheel to the rear corner wheel; and the movable one of the support wheels is disposed between the suspension member and the first lateral edge of the endless track.

56. The track assembly claimed in claim 55, wherein the first lateral edge of the endless track is located closer to a center of the vehicle than the second lateral edge of the endless track when the track assembly is mounted to the vehicle.

57. The track assembly claimed in claim 55, wherein the fixed one of the support wheels is disposed between the suspension member and the second lateral edge of the endless track.

58. The track assembly claimed in claim 57, wherein the movable one of the support wheels extends lower than the fixed one of the support wheels when the ground surface is horizontal.

59. The track assembly claimed in claim 33, wherein a distance between an axis of rotation of the drive wheel and the axis of rotation of the front corner wheel in the longitudinal direction of the track assembly is different from a distance between the axis of rotation of the drive wheel and the axis of rotation of the rear corner wheel in the longitudinal direction of the track assembly.

60. The track assembly claimed in claim 33, wherein the track assembly is pivotable relative to the body of the vehicle about an axis of rotation of the drive wheel.

61. The track assembly claimed in claim 33, wherein the track assembly is mountable to the vehicle in place of a ground-engaging wheel comprising a tire.

62. The track assembly claimed in claim 33, wherein the vehicle is an ATV.

63. The track assembly claimed in claim 62, wherein the ATV comprises handlebars for steering the ATV.

64. A set of four track assemblies for providing traction to a vehicle on a ground surface, each track assembly of the set of four track assemblies comprising:
 a) an endless track comprising:
  i. a ground-engaging outer surface for engaging the ground surface; and
  ii. an inner surface opposite to the ground-engaging outer surface; and
 b) a track-engaging system for driving and guiding the endless track, the track-engaging system comprising:
  i. a drive wheel for driving the endless track;
  ii. a front corner wheel and a rear corner wheel spaced apart in a longitudinal direction of the track assembly;
  iii. a plurality of support wheels disposed between the front corner wheel and the rear corner wheel in the longitudinal direction of the track assembly; and
  iv. a wheel-supporting arrangement supporting the front corner wheel, the rear corner wheel, and the support wheels,
 the endless track being disposed around the track-engaging system, a lower run of the endless track extending under the front corner wheel, the rear corner wheel, and the support wheels to engage the ground surface;
 wherein the wheel-supporting arrangement of a given track assembly of the set of four track assemblies is configured such that, when the given track assembly moves on the ground surface;
  an axis of rotation of a movable one of the support wheels of the given track assembly is movable relative to an axis of rotation of the front corner wheel of the given track assembly and an axis of rotation of the rear corner wheel of the given track assembly to vary a distance between the axis of rotation of the movable one of the support wheels of the given track assembly and the axis of rotation of the front corner wheel of the given track assembly and vary a distance between the axis of rotation of the movable one of the support wheels of the given track assembly and the axis of rotation of the rear corner wheel of the given track assembly; and
  an axis of rotation of a fixed one of the support wheels of the given track assembly is substantially fixed relative to the axis of rotation of the front corner wheel of the given track assembly and the axis of rotation of the rear corner wheel of the given track assembly to substantially maintain a distance between the axis of rotation of the fixed one of the support wheels of the given track assembly and the axis of rotation of the front corner wheel of the given track assembly and substantially maintain a distance between the axis of rotation of the fixed one of the support wheels of the given track assembly and the axis of rotation of the rear corner wheel of the given track assembly;
 wherein each of at least two track assemblies of the set of four track assemblies is mountable to the vehicle such that each of the at least two track assemblies is steerable by a steering device of the vehicle to change an orientation of each of the at least two track assemblies relative to a body of the vehicle in order to turn the vehicle.

* * * * *